(12) United States Patent
Lee et al.

(10) Patent No.: US 12,362,361 B2
(45) Date of Patent: Jul. 15, 2025

(54) CATHODE FOR LITHIUM SECONDARY BATTERY AND LITHIUM SECONDARY BATTERY INCLUDING THE SAME

(71) Applicants: SK INNOVATION CO., LTD., Seoul (KR); SK ON CO., LTD., Seoul (KR)

(72) Inventors: Yong Seok Lee, Daejeon (KR); Jeong Hoon Jeun, Daejeon (KR); Jae Ram Kim, Daejeon (KR); Jae Yun Min, Daejeon (KR); Ki Joo Eom, Daejeon (KR); Myung Ro Lee, Daejeon (KR); Hyun Joong Jang, Daejeon (KR); Je Nam Choi, Daejeon (KR)

(73) Assignees: SK INNOVATION CO., LTD., Seoul (KR); SK ON CO., LTD., Seoul (KR)

( * ) Notice: Subject to any disclaimer, the term of this patent is extended or adjusted under 35 U.S.C. 154(b) by 0 days.

(21) Appl. No.: 18/457,074

(22) Filed: Aug. 28, 2023

(65) Prior Publication Data

US 2024/0154110 A1 May 9, 2024

(30) Foreign Application Priority Data

Nov. 8, 2022 (KR) .................. 10-2022-0148162

(51) Int. Cl.
*H01M 4/525* (2010.01)
*H01M 4/62* (2006.01)
(Continued)

(52) U.S. Cl.
CPC .......... *H01M 4/525* (2013.01); *H01M 4/625* (2013.01); *H01M 4/626* (2013.01);
(Continued)

(58) Field of Classification Search
CPC ...... H01M 4/525; H01M 4/625; H01M 4/626; H01M 10/052; H01M 2004/021; H01M 2004/028
See application file for complete search history.

(56) References Cited

U.S. PATENT DOCUMENTS

| 11,888,155 B1* | 1/2024 | Lee ................ H01M 4/525 |
| 2013/0004657 A1* | 1/2013 | Xu ................ H01B 1/24 |
| | | 252/511 |

(Continued)

FOREIGN PATENT DOCUMENTS

| CN | 113903906 A | 1/2022 |
| EP | 4039652 A1 | 8/2022 |

(Continued)

OTHER PUBLICATIONS

Machine English translation of KR 10-2021-0079178 (Year: 2021).*

*Primary Examiner* — Michael L Dignan
(74) *Attorney, Agent, or Firm* — Perkins Coie LLP (57) ABSTRACT

Cathodes and lithium secondary batteries including the cathodes are disclosed. In some implementations, a cathode may include a cathode current collector and a cathode active material layer disposed on the cathode current collector and including cathode active material particles such that the cathode active material layer satisfies a specific equation. The cathode active material particles may include lithium metal oxide particles that include nickel, and may have a mole fraction of cobalt of 0.02 or less with respect to all elements except for lithium and oxygen.

11 Claims, 2 Drawing Sheets

(51) Int. Cl.
*H01M 10/052* (2010.01)
*H01M 4/02* (2006.01)

(52) U.S. Cl.
CPC .... *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 2014/0038052 A1* | 2/2014 | Song | H01M 4/5815 |
| | | | 429/223 |
| 2020/0075930 A1* | 3/2020 | Kim | H01M 4/505 |
| 2020/0185714 A1* | 6/2020 | Han | H01M 4/525 |
| 2020/0203767 A1* | 6/2020 | Cheng | H01M 10/0568 |
| 2021/0075010 A1* | 3/2021 | Lim | H01M 4/525 |
| 2023/0093081 A1* | 3/2023 | Frieberg | H01M 4/583 |
| | | | 429/209 |
| 2024/0097125 A1* | 3/2024 | Lee | H01M 4/131 |
| 2024/0120481 A1* | 4/2024 | Harada | H01M 4/1397 |

FOREIGN PATENT DOCUMENTS

| | | | | |
|---|---|---|---|---|
| KR | 10-0732896 B1 | 6/2007 | | |
| KR | 10-2017-0012222 A | 2/2017 | | |
| KR | 10-2020-0070649 A | 6/2020 | | |
| KR | 10-2020-0085679 A | 7/2020 | | |
| KR | 10-2021-0079178 | * | 6/2021 | H01M 4/1315 |
| KR | 10-2021-0079178 A | 6/2021 | | |

\* cited by examiner

CATHODE FOR LITHIUM SECONDARY BATTERY AND LITHIUM SECONDARY BATTERY INCLUDING THE SAME

CROSS-REFERENCE TO RELATED APPLICATION

This patent document claims the priority and benefits of Korean Patent Application No. 10-2022-0148162 filed on Nov. 8, 2022, the entire disclosure of which is incorporated by reference herein.

TECHNICAL FIELD

The disclosed technology relates to a cathode for a lithium secondary battery and a lithium secondary battery including the same. More specifically, the disclosed technology relates to a cathode for a lithium secondary battery that includes nickel-containing lithium metal oxide particles as a cathode active material and a lithium secondary battery including the cathode.

BACKGROUND

The rapid growth of electric vehicles and portable devices, such as camcorders, mobile phones, and laptop computers, has brought increasing demands for secondary batteries, which can be repeatedly charged and discharged. Lithium secondary batteries have a high operating voltage and a high energy density per unit weight, and are now widely used as a power source due to certain advantages over other types of batteries, including, e.g., their fast charging speed and light weight.

SUMMARY

The disclosed technology can be implemented in some embodiments to provide a cathode for a lithium secondary battery having improved operational stability and chemical stability.

The disclosed technology can also be implemented in some embodiments to provide a lithium secondary battery that includes the cathode having improved operational stability and chemical stability.

In some embodiments of the disclosed technology, a cathode for a lithium secondary battery includes a cathode current collector; and a cathode active material layer which is formed on the cathode current collector, comprises cathode active material particles, and satisfies Equation 1. The cathode active material particles include lithium metal oxide particles which contain nickel and have a mole fraction of cobalt of 0.02 or less with respect to all elements except for lithium and oxygen.

$$D_A \leq 4 \text{ μm} \qquad \text{[Equation 1]}$$

In Equation 1, $D_A$ is an arithmetic average value of the top 100 diameters obtained by: in a three-dimensional (3D) model illustrating a distribution of the cathode active material particles in the cathode active material layer, analyzing paths passing between the cathode active material particles and passing through both sides in a thickness direction of the 3D model; measuring diameters of the largest spheres capable of passing through each of the paths; and arranging the measured diameters in descending order.

In one embodiment, $D_A$ may be in a range of 0.5 μm≤$D_A$≤4 μm.

In one embodiment, the cathode active material layer may satisfy Equation 2.

$$L_A \geq 47 \text{ μm} \qquad \text{[Equation 2]}$$

In Equation 2, $L_A$ is an arithmetic average value of lengths of the top 100 paths obtained by: in the 3D model illustrating a distribution of the cathode active material particles in the cathode active material layer, analyzing paths passing between the cathode active material particles and passing through both sides in a thickness direction of the 3D model; measuring diameters of the largest spheres capable of passing through each of the paths; and arranging the paths in descending order of the diameters.

In one embodiment, $L_A$ may be in a range of 47 μm≤$L_A$≤65 μm.

In one embodiment, the lithium metal oxide particles may not contain cobalt.

In one embodiment, the molar fraction of nickel in the lithium metal oxide particles may be 0.7 to 0.85 with respect to all elements except for lithium and oxygen.

In one embodiment, the lithium metal oxide particles may include first lithium metal oxide particles having a secondary particle shape in which a plurality of primary particles are aggregated, and second lithium metal oxide particles having a single particle shape. Each of the first lithium metal oxide particles and the second lithium metal oxide particles may contain nickel, and a mole fraction of cobalt may be 0.02 or less with respect to all elements except for lithium and oxygen.

In one embodiment, a ratio of a weight of the second lithium metal oxide particles to a weight of the first lithium metal oxide particles in the cathode active material layer may be 1/4 to 4.

In one embodiment, the lithium metal oxide particles may include first lithium metal oxide particles and second lithium metal oxide particles having an average particle diameter ($D_{50}$) smaller than that of the first lithium metal oxide particles. Each of the first lithium metal oxide particles and the second lithium metal oxide particles may contain nickel, and a mole fraction of cobalt may be 0.02 or less of all elements except for lithium and oxygen.

In one embodiment, the first lithium metal oxide particles may have an average particle diameter ($D_{50}$) of 9 μm to 20 μm, and the second lithium metal oxide particles may have an average particle diameter ($D_{50}$) of 2 μm to 7 μm.

In one embodiment, the cathode active material layer may further include a conductive material and a binder.

In one embodiment, a content of the cathode active material particles may be 85% to 98% by weight based on a total weight of the cathode active material layer.

In one embodiment, the conductive material may include a linear-type conductive material and a dot-type conductive material.

In one embodiment, the linear-type conductive material may have a length of 15 μm to 65 μm.

In one embodiment, the dot-type conductive material may have a particle diameter ($D_{50}$) of 10 nm to 60 nm.

In one embodiment, the cathode active material layer may have a density of 3.4 g/cc to 3.7 g/cc.

In some embodiments of the disclosed technology, a lithium secondary battery includes: the cathode for a lithium secondary battery based on some embodiments of the disclosed technology; and an anode facing the cathode.

In some embodiments of the disclosed technology, the cathode for a lithium secondary battery may include lithium metal oxide particles containing a low content of cobalt and/or lithium metal oxide particles which do not contain cobalt. The cathode for a lithium secondary battery satisfies Equation 1 to be described below, such that high-temperature storage characteristics and life-span characteristics may be improved even when using lithium metal oxide particles having a low content of cobalt.

The lithium secondary battery based on some embodiments of the disclosed technology may include a cathode that can improve the high-temperature storage characteristics and life-span characteristics of the lithium secondary battery.

DETAILED DESCRIPTION

A lithium secondary battery may include: an electrode assembly that includes a cathode, an anode, and a separation membrane interposed between the cathode and the anode; and an electrolyte in which the electrode assembly is impregnated in a case.

The cathode may include a cathode current collector and a cathode active material layer formed on the cathode current collector. The cathode active material layer may include a lithium metal oxide as a cathode active material. Examples of the cathode active material may include lithium cobalt oxide ($LiCoO_2$); lithium nickel oxide ($LiNiO_2$); lithium manganese oxide (such as $LiMnO_2$, $LiMn_2O_4$, etc.); lithium iron phosphate compound ($LiFePO_4$); NCM-based lithium metal oxide containing nickel, cobalt and manganese; NCA-based lithium metal oxide containing nickel, cobalt and aluminum, etc.

The price of cobalt is relatively high compared to other metals such as nickel, manganese and others and thus a power source of an electric vehicle using a large amount of lithium metal oxide particles containing cobalt in a high concentration is less cost effective.

In an example implementation, a lithium secondary battery having improved life-span characteristics by employing lithium metal oxide particles containing a very small amount of cobalt only on the surface thereof.

Lithium metal oxides that do not contain cobalt are cost effective, but the crystal structure of the particle in the lithium metal oxide particles may become unstable in the absence of cobalt, and thus the high-temperature storage stability and life-span characteristics of the battery may be deteriorated.

The disclosed technology can be implemented in some embodiments to provide a cathode for a lithium secondary battery including a cathode active material layer that includes lithium metal oxide particles. The disclosed technology can also be implemented in some embodiments to provide a lithium secondary battery including such a cathode.

Cathode for Lithium Secondary Battery

Figure 1:
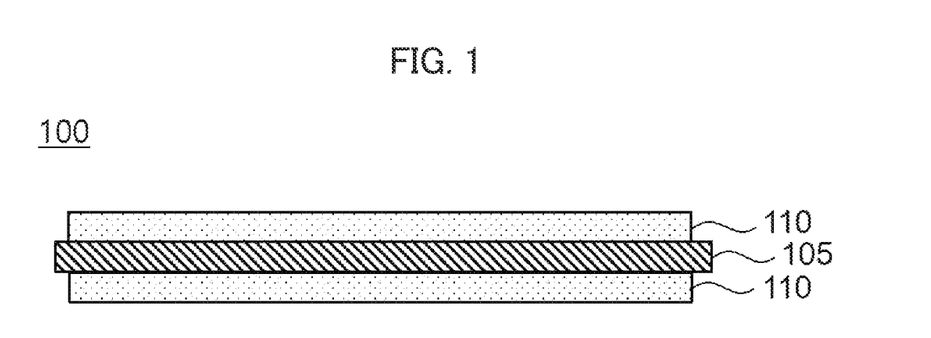
FIG. 1 is a schematic cross-sectional view of a cathode for a lithium secondary battery based on some embodiments of the disclosed technology.

FIG. 1 is a schematic cross-sectional view of a cathode for a secondary lithium battery based on some embodiments of the disclosed technology.

Referring to FIG. 1, a cathode 100 for a lithium secondary battery may include a cathode current collector 105 and a cathode active material layer 110 formed on the cathode current collector 105.

In some implementations of the disclosed technology, the cathode active material layer 110 may be formed on one surface or both surfaces of the cathode current collector 105.

In some implementations of the disclosed technology, the cathode current collector 105 may include stainless steel, nickel, aluminum, titanium, copper, or an alloy thereof.

The cathode active material layer 110 may include cathode active material particles capable of reversibly intercalating and deintercalating lithium ions.

In some embodiments of the disclosed technology, the cathode active material particles may include lithium metal oxide particles that includes cobalt such that a molar fraction of cobalt is 0.02 or less with respect to all elements except for lithium and oxygen. For example, in the lithium metal oxide particles, the content of cobalt may be 2 mol % or less out of all elements (100 mol %) except for lithium and oxygen.

In one embodiment, the mole fraction of cobalt in the lithium metal oxide particles may be 0.015 or less. For example, the mole fraction of cobalt in the lithium metal oxide particles may be 0.01 or less.

In some embodiments, the lithium metal oxide particle may not substantially contain cobalt. For example, cobalt may not be detected when analyzing components of lithium metal oxide particles.

In one embodiment, the lithium metal oxide particles may be nickel-based lithium metal oxide particles containing nickel.

In some embodiments, the mole fraction of nickel in the lithium metal oxide may be 0.6 to 0.9 out of all elements except for lithium and oxygen. In one embodiment, the mole fraction of nickel in the lithium metal oxide may be 0.65 to 0.85 out of all elements except for lithium and oxygen. For example, the mole fraction of nickel in the lithium metal oxide may be 0.7 to 0.85 out of all elements except for lithium and oxygen.

In some embodiments, the lithium metal oxide particles may be nickel-manganese-based lithium metal oxide particles containing nickel and manganese.

In some embodiments, the mole fraction of manganese in the lithium metal oxide particles may be 0.05 to 0.3 out of all elements except for lithium and oxygen. In one embodiment, the mole fraction of manganese in the lithium metal oxide particles may be 0.1 to 0.3 out of all elements except for lithium and oxygen.

In one embodiment, the lithium metal oxide particles may be represented by Formula 1 below.

$$Li_aNi_xCo_yMn_zM_{1-x-y-z}O_2 \qquad \text{[Formula 1]}$$

In Formula 1, "M" may be at least one of Mg, V, Ti, Al, Fe, Ru, Zr, W, Sn, Nb, Mo, Cu, Zn, Cr, Ga, V or Bi.

In Formula 1, "a," "x," "y" and "z" may be in a range of $0.9 \leq a \leq 1.2$, $0.6 \leq x \leq 0.9$, $0 \leq y \leq 0.02$, and $0.8 \leq x+y+z \leq 1$, respectively.

In some embodiments, "a" may be in a range of $0.9 \leq a < 1.1$.

In some embodiments, "y" may be 0.015 or less or 0.01 or less ($y \leq 0.015$ or $y \leq 0.01$).

In some embodiments, "y" may be greater than 0 or greater than 0.001 (y>0, or y>0.001).

In some embodiments, "y" may be 0 (y=0). For example, Formula 1 may be represented by $Li_aNi_xMn_zM_{1-x-z}O_2$.

In some embodiments, "x" may be in a range of $0.65 \leq x \leq 0.85$ or $0.7 \leq x \leq 0.85$.

The lithium metal oxide particles may contain a small amount (mole fraction greater than 0 and less than 0.02) of cobalt or may exclude cobalt, such that manufacturing costs may be reduced. Conventionally, the crystal structure of the lithium metal oxide particles is unstable, such that a lithium secondary battery using the lithium metal oxide particles may have deteriorated high-temperature storage characteristics.

However, the cathode active material layer 110 based on embodiments of the disclosed technology may satisfy Equation 1 and/or Equation 2 below. Accordingly, high-temperature storage characteristics of the lithium secondary battery may be improved even when using the lithium metal oxide particles.

For examples, the cathode active material layer 110 may satisfy Equation 1 below.

$$D_A \leq 4 \, \mu m \quad \text{[Equation 1]}$$

In Equation 1, $D_A$ is an arithmetic average value of the top 100 diameters obtained by a three-dimensional (3D) model illustrating a distribution of the cathode active material particles in a cathode active material layer 110. The top 100 diameters may be obtained by: analyzing paths passing between the cathode active material particles and passing through both sides of the 3D model in a thickness direction of the 3D model; measuring diameters of the largest spheres that can pass through each of the paths; and arranging the measured diameters in descending order. In some implementations, an inequality can be referred to as an equation.

In some embodiments, $D_A$ may be 0.5 μm or more. In one embodiment, $D_A$ may be 1.5 μm or more. For example, $D_A$ may be 2.0 μm or more.

In some embodiments, $D_A$ may be 3.8 μm or less. In one embodiment, $D_A$ may be 3.3 μm or less. For example, $D_A$ may be 2.6 μm or less. For example, $D_A$ may be in a range of $0.5 \, \mu m \leq D_A \leq 4 \, \mu m$, $1.5 \, \mu m \leq D_A \leq 3.8 \, \mu m$, or $2.0 \, \mu m \leq D_A \leq 2.6 \, \mu m$.

When the $D_A$ is greater than 4 μm, high-temperature storage characteristics of the lithium secondary battery may be compromised when using the lithium metal oxide particles. For example, the longer the $D_A$, the more the lithium metal oxide particles are pressed during rolling, and thus deformation or damage of the particles may occur. Therefore, cracks may occur on the surface of the lithium metal oxide particles, and a new interface generated by the cracks may cause a side reaction with an electrolyte, thereby resulting in a reduction in high-temperature storage characteristics.

When $D_A$ is too small, the particles may be damaged due to a stress caused by contact between the lithium metal oxide particles, and contact resistance may be increased, thereby resulting in a reduction in output characteristics and storage characteristics.

For examples, the cathode active material layer 110 may satisfy Equation 2 below.

$$L_A \geq 47 \, \mu m \quad \text{[Equation 2]}$$

In Equation 2, $L_A$ is an arithmetic average value of lengths of the top 100 paths obtained by the 3D model illustrating a distribution of the cathode active material particles in the cathode active material layer 110. The top 100 paths may be obtained by: analyzing paths passing between the cathode active material particles and passing through both sides in a thickness direction of the 3D model; measuring diameters of the largest spheres that can pass through each of the paths; and arranging the paths in descending order of the diameters.

When the $L_A$ is less than 47 μm, high-temperature storage characteristics of the lithium secondary battery may be compromised when using the lithium metal oxide particles. For example, the shorter $L_A$, the more cracks occur on the surface of the particles due to contact between the lithium metal oxide particles and pressing during rolling. Accordingly, a side reaction between the lithium metal oxide particles and the electrolyte is increased, such that physical properties of the particles may be deteriorated, and irreversible consumption of the electrolyte may occur.

In some embodiments, $L_A$ may be 65 μm or less. In one embodiment, $L_A$ may be 60 μm or less. For example, $L_A$ may be 55 μm or less.

In some embodiments, $L_A$ may be 48 μm or more. In one embodiment, $L_A$ may be 49 μm or more. In one embodiment, $L_A$ may be 50 μm or more. For example, $L_A$ may be in a range of $47 \, \mu m \leq L_A \leq 65 \, \mu m$, $48 \, \mu m \leq L_A \leq 60 \, \mu m$, or $50 \, \mu m \leq L_A \leq 55 \, \mu m$.

The longer $L_A$, the more voids are formed in the cathode active material layer 110, and energy density may be decreased, such that movement paths of lithium ions become longer. For example, when $L_A$ is 65 μm or less, the capacity of the lithium secondary battery may be increased, and output characteristics may be improved.

Figure 2:
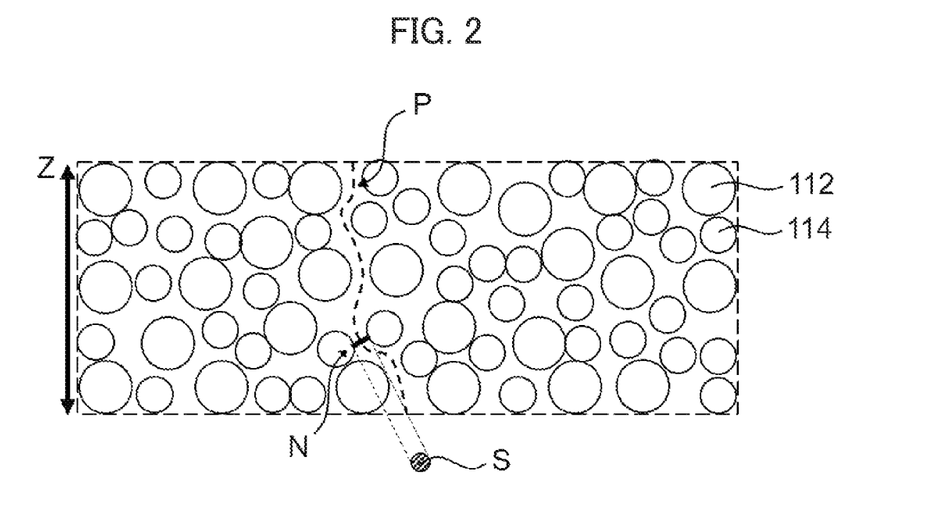
FIG. 2 is a two-dimensional cross-sectional view illustrating a distribution of cathode active material particles and Equations 1 and 2 in a cathode active material layer of the cathode for a lithium secondary battery based on some embodiments of the disclosed technology.

FIG. 2 is a two-dimensional (2D) cross-sectional view illustrating a distribution of cathode active material particles in the cathode active material layer and Equations 1 and 2. In FIG. 2, a 2D cross-section picture was shown instead of a 3D model for the convenience of description and understanding.

Referring to FIG. 2, cathode active material particles 112 and 114 may be distributed in the cathode active material layer 110 such that cathode active material particles 112 and 114 are in contact with each other or spaced apart from each other. In some implementations, a path P (a dotted line in FIG. 2) passing between the cathode active material particles 112 and 114 and passing through both sides of the cathode active material layer 110 in a thickness direction Z (a direction indicated by an arrow in FIG. 2) may be formed. In this case, a plurality of paths may be formed.

A maximum size of a sphere (sphericity: 1) allowed to pass through each path can be analyzed. For example, in FIG. 2, the maximum size of a sphere that can pass through the path P may be determined by N, where N indicates the narrowest neck. That is, the sphere having the maximum size that can pass through the path P may be a sphere S.

$D_A$ in Equation 1 may correspond to an arithmetic average value of the top 100 diameters when arranging the diameters of the spheres S that can pass through each of the paths in descending order. In addition, $L_A$ in Equation 2 may correspond to an arithmetic mean value of lengths of the top 100 paths when arranging the paths in descending order of the diameters of the spheres S.

For example, $D_A$ and $L_A$ in Equations 1 and 2 may be controlled by various factors such as a particle diameter and content of cathode active material particles in the cathode active material layer, size and content of a conductive material, size and content of a binder, and thickness and density of the cathode active material layer, etc.

For example, $D_A$ and $L_A$ may be controlled according to the form of the cathode active material particles present in the cathode active material layer 110, a degree of dispersion or uniformity of the particles, etc. For example, as particles having a large particle diameter and particles having a small particle diameter are more uniformly mixed, packing properties between the lithium metal oxide particles may be increased, and $D_A$ and $L_A$ of the cathode active material layer 110 may be changed.

In addition, a region occupied by the particles in the cathode active material layer 110 may be adjusted by the conductive material or binder included therein, and thereby $D_A$ and $L_A$ may be controlled. For example, an interval between the cathode active material particles may be increased according to a space occupied by the conductive material or binder, and a degree of binding between the cathode active material particles may vary depending on the binder, such that $D_A$ and $L_A$ of the cathode active material layer 110 may be controlled.

In addition, $D_A$ and $L_A$ may be controlled by the thickness and density of the cathode active material layer 110. For example, as the thickness of the cathode active material layer 110 is increased, $L_A$ may be increased as the path passing through both sides of the cathode active material layer 110 becomes longer. For example, $D_A$ may be reduced as the density of the cathode active material layer is decreased.

As described above, by controlling $D_A$ and/or $L_A$ of the cathode active material layer 110 within the ranges of Equation 1 and/or Equation 2, respectively, high-temperature stability of the cathode may be improved.

Therefore, even if the lithium metal oxide particles have a low content of cobalt, high-temperature storage properties may be improved, and a side reaction with the electrolyte and a gas generation amount may be reduced. Accordingly, a cathode having high life-span characteristics may be provided at a low cost, and the content of nickel may be relatively increased, such that the capacity, output and charging performance of the secondary battery may be improved.

In one embodiment, the lithium metal oxide particles may further contain a doping element. For example, the doping element may contain at least one of Al, Ti, Ba, Zr, Si, B, Mg, P, Sr, W, or La.

In one embodiment, the cathode active material may further include a coating layer formed on at least a portion of the surface of the lithium metal oxide particles. For example, the coating layer may contain at least one of Al, Ti, Ba, Zr, Si, B, Mg, P, Sr, W, or La.

In one embodiment, the lithium metal oxide particle may include first lithium metal oxide particles 112 and second lithium metal oxide particles 114 having an average particle diameter ($D_{50}$) smaller than that of the first lithium metal oxide particles 112. The average particle diameter ($D_{50}$) may be defined as a particle diameter at a point of 50% of a volume-based particle diameter cumulative distribution. The average particle diameter ($D_{50}$) may be measured using a laser diffraction method (e.g., Microtrac, MT 3000).

In some embodiments, the first lithium metal oxide particles 112 may have an average particle diameter ($D_{50}$) of 9 μm to 20 μm, preferably 10 μm to 18 μm.

In some embodiments, the second lithium metal oxide particles 114 may have an average particle diameter ($D_{50}$) of 1 μm or more and less than 9 preferably 2 μm to 7 μm.

In some embodiments, a ratio of a weight of the second lithium metal oxide particles 114 to a weight of the first lithium metal oxide particles 112 in the cathode active material layer 110 may be 1/4 to 4, for example, 3/7 to 7/3.

In one embodiment, the first lithium metal oxide particles 112 may have a secondary particle shape in which a plurality of primary particles are aggregated. The second lithium metal oxide particles 114 may have a single particle shape.

For example, the single particle and the secondary particle may be classified based on a cross-sectional image of the particle measured by a scanning electron microscope (SEM).

For example, the secondary particle may include a plurality of primary particles aggregated such that the plurality of aggregated primary particles can be considered or observed as substantially a single particle. For example, in the case of the secondary particle, a boundary of the primary particles may be observed in the cross-sectional SEM image.

For example, the secondary particle may include aggregated primary particles greater than 10 primary particles. In one example, the secondary particle may include 30 or more aggregated primary particles. In one example, the secondary particle may include 50 or more aggregated primary particles. In one example, the secondary particle may include 100 or more of primary particles aggregated therein.

For example, the single particle may mean a monolithic body rather than an aggregate. For example, in the case of the single particle, the boundary of the primary particles may not be observed in the SEM cross-sectional image, unlike the secondary particles.

In some implementations, the single particle may have a form in which fine particles (e.g., particles having a volume of 1/100 or less based on a volume of the single particle) are attached to the surface thereof, and the form is not excluded from the concept of the single particle.

For example, the single particles may be present in contact with each other. For example, 2 to 10, 2 to 5, or 2 and 3 single particles may be present in contact with each other.

In one embodiment, the cathode active material layer 110 may have a density of 2.5 g/cc to 3.7 g/cc, 2.8 g/cc to 3.7 g/cc, 3.0 g/cc to 3.7 g/cc, or 3.2 g/cc to 3.7 g/cc, or 3.4 g/cc to 3.7 g/cc.

For example, if the density of the cathode active material layer 110 is greater than 3.7 g/cc, high-temperature stability may be reduced, and a side reaction between the cathode active material and the electrolyte and gas generation may be increased. Within the above range, $D_A$ and $L_A$ of the cathode active material layer may be easily controlled, such that high-temperature storage characteristics of the lithium secondary battery may be improved.

In one embodiment, the cathode active material layer 110 may further include a conductive material and a binder.

In some embodiments, a content of the cathode active material particles may be 85 wt. % to 98 wt. %, or 90 wt. % to 95 wt. % based on a total weight of the cathode active material layer 110.

In some embodiments, the content of the conductive material may be 1 wt. % to 10 wt. %, or 1 wt. % to 5 wt. % based on the total weight of the cathode active material layer 110.

In some embodiments, the content of the binder may be 1 wt. % to 10 wt. %, or 1 wt. % to 5 wt. % based on the total weight of the cathode active material layer 110.

In one embodiment, the conductive material may include a linear-type conductive material. For example, the linear-type conductive material may include a fibrous conductive material.

In some embodiments, the linear-type conductive material may have an aspect ratio (length to diameter ratio) of 2 to 10,000, 10 to 5,000, 50 to 3,000, or 100 to 1,000.

In some embodiments, the linear-type conductive material may include carbon nanotubes (CNTs).

For example, the linear-type conductive material may include single-walled CNTs (SWCNTs), double-walled CNTs (DWCNTs), multi-walled CNTs (MWCNTs), rope type carbon nanotubes (rope CNTs), or others.

In some embodiments, the linear-type conductive material may have a length of 15 µm to 65 µm.

In some embodiments, the conductive material may further include a dot-type conductive material. In this case, the linear-type conductive material may form a conductive network in a wide range, and the dot-type conductive material may additionally form a conductive network in a narrow range. Accordingly, it is possible to prevent a decrease in electrical conductivity caused by using the lithium metal oxide particles. When using the dot-type conductive material in combination with lithium metal oxide particles having a cobalt content of 2 mol % or more, an effect of improving electrical conductivity is small, and rather, the rapid charging characteristics of the lithium secondary battery may be reduced.

In some embodiments, the dot-type conductive material may have an aspect ratio (length to diameter ratio) of 0.5 to 1.5.

In some embodiments, the dot-type conductive material may have a sphericity of 0.7 to 1, 0.8 to 1, or 0.9 to 1.

In some embodiments, the dot-type conductive material may have a particle diameter ($D_{50}$) of 10 nm to 100 nm. In one embodiment, the dot-type conductive material may have a particle diameter ($D_{50}$) of 10 nm to 60 nm. For example, the dot-type conductive material may have a particle diameter ($D_{50}$) of 20 nm to 50 nm.

For example, the dot-type conductive material may include a carbon-based conductive material such as graphite, carbon black, graphene, and carbon nanotubes; and a metal-based conductive material such as tin, tin oxide, titanium oxide, $LaSrCoO_3$, $LaSrMnO_3$ or others.

In some embodiments, a ratio of a content of the dot-type conductive material to a content of the linear-type conductive material may be in a range 1/9 to 9 based on the total weight of the cathode active material layer 110. In one example, a ratio of a content of the dot-type conductive material to a content of the linear-type conductive material may be in a range 1.5 to 4, or 1.8 to 3.5 based on the total weight of the cathode active material layer 110. In another example, a ratio of a content of the dot-type conductive material to a content of the linear-type conductive material may be in a range 2 to 3 based on the total weight of the cathode active material layer 110.

In one embodiment, the binder may include a linear-type binder. In some embodiments, the linear-type binder may include polyvinylidene fluoride (PVDF), vinylidene fluoride-hexafluoropropylene copolymer (PVDF-co-HFP), or others.

In some embodiments, the linear-type binder may have an aspect ratio (length to diameter ratio) of 2 to 10,000, 10 to 5,000, 50 to 3,000, or 100 to 1,000.

In one embodiment, the binder may include a dot-type binder. In some embodiments, the dot-type binder may include styrene-butadiene rubber (SBR), or others.

In some embodiments, the dot-type binder may have an aspect ratio (length to diameter ratio) of 0.5 to 1.5.

In some embodiments, the dot-type binder may have a sphericity of 0.7 to 1, 0.8 to 1, or 0.9 to 1.

Lithium Secondary Battery

Figure 3:
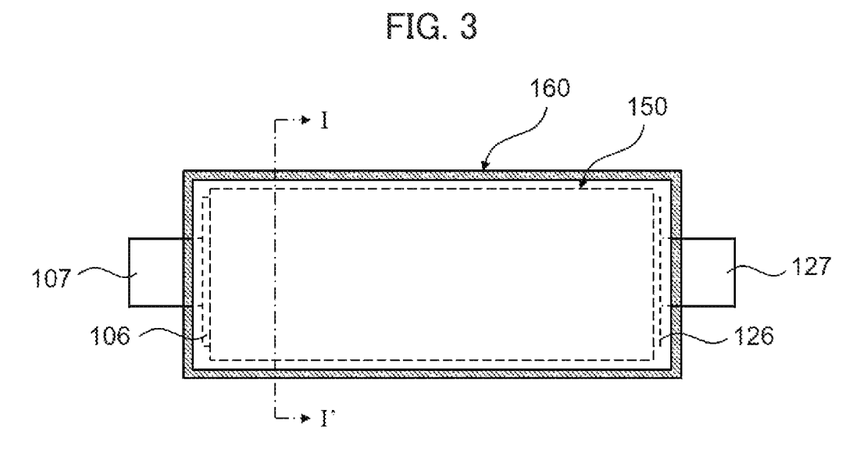
FIG. 3 is a plan view of a lithium secondary battery based on some embodiments of the disclosed technology.
Figure 4:
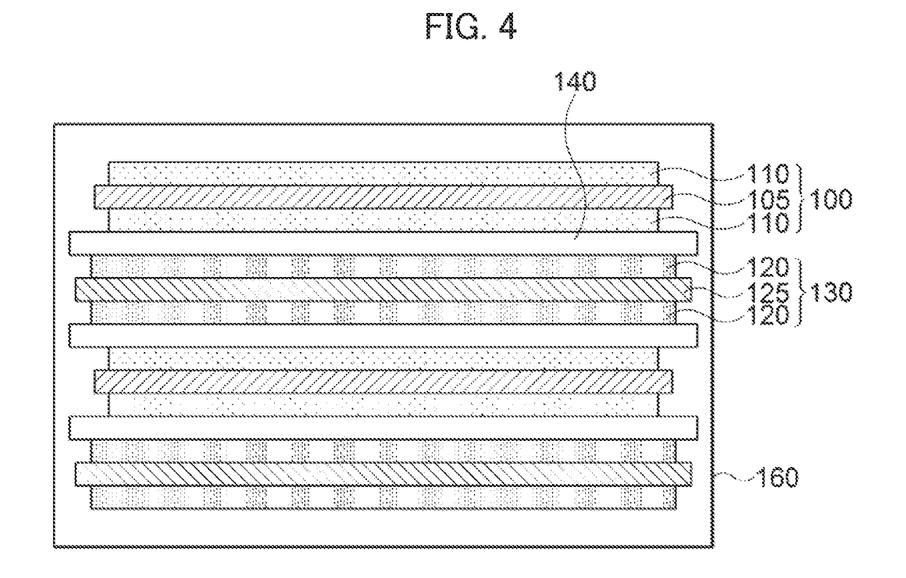
FIG. 4 is a cross-sectional view of a lithium secondary battery based on some embodiments of the disclosed technology.

FIG. 3 is a plan view of a lithium secondary battery based on some embodiments of the disclosed technology. FIG. 4 is a cross-sectional view of a lithium secondary battery based on some embodiments of the disclosed technology.

An anode 130 may include an anode current collector 125 and an anode active material layer 120 formed on the anode current collector 125. For example, the anode active material layer 120 may be formed on one surface or both surfaces of the anode current collector 125.

For example, the anode active material layer 120 may include an anode active material. In one embodiment, the anode active material layer 120 may further include a binder, a conductive material, or others.

For example, the anode current collector 125 may include gold, stainless steel, nickel, aluminum, titanium, copper, or an alloy thereof.

For example, the anode active material may include a material capable of intercalating and deintercalating lithium ions. For example, the anode active material may include a lithium alloy, a carbon-based active material, a silicon-based active material, or others, and these may be used alone or in combination of two or more thereof.

For example, the lithium alloy may include aluminum, zinc, bismuth, cadmium, antimony, silicon, lead, tin, gallium, indium, or others.

For example, the carbon-based active material may include crystalline carbon, amorphous carbon, carbon composite, carbon fiber, or others.

For example, the amorphous carbon may include hard carbon, cokes, mesocarbon microbeads (MCMB), mesophase pitch-based carbon fiber (MPCF), or others.

For example, the crystalline carbon may include natural graphite, artificial graphite, graphite cokes, graphite MCMB, graphite MPCF, or others.

In one embodiment, the anode active material may include a silicon-based active material. For example, the silicon-based active material may include Si, $SiO_x$ ($0<x<2$), Si/C, SiO/C, Si-metal, or others. In this case, it is possible to implement a lithium secondary battery having a high capacity.

In some embodiments, the anode 130 may have an area greater than that of the cathode 100. Accordingly, lithium ions generated from the cathode 100 may smoothly move to the anode 130 without precipitation in the middle.

For example, the cathode 100 and the anode 130 may be alternately and repeatedly disposed to form an electrode assembly 150.

In one embodiment, a separation membrane 140 may be interposed between the cathode 100 and the anode 130. For example, the electrode assembly 150 may be formed by winding, stacking, z-folding, etc. the separation membrane 140

In some embodiments, the separation membrane 140 may include a porous polymer film made of a polyolefin polymer such as ethylene homopolymer, propylene homopolymer, ethylene/butene copolymer, ethylene/hexene copolymer, ethylene/methacrylate copolymer or others. In some embodiments, the separation membrane 140 may include a nonwoven fabric made of glass fiber having a high melting point, polyethylene terephthalate fiber or others.

A lithium secondary battery implemented based on some embodiments may include a cathode lead 107 connected to the cathode 100 and protruding to an outside of a case 160, and an anode lead 127 connected to the anode 130 and protruding to the outside of the case 160.

The cathode lead 107 may be connected to the cathode current collector 105. In addition, the anode lead 127 may be connected to the anode current collector 125.

The cathode current collector 105 may include a cathode tab 106 protruding from one side. The cathode active material layer 110 may not be formed on the cathode tab 106. The cathode tab 106 may be formed integrally with the cathode current collector 105 or may be connected thereto by welding or others. The cathode current collector 105 and the cathode lead 107 may be electrically connected with each other through the cathode tab 106.

The anode current collector 125 may include an anode tab 126 protruding from one side. The anode active material layer 120 may not be formed on the anode tab 126. The anode tab 126 may be formed integrally with the anode current collector 125 or may be connected thereto by welding or others. The anode current collector 125 and the anode lead 127 may be electrically connected with each other through the anode tab 126.

For example, the electrode assembly 150 and the electrolyte may be housed in the case 160 to form a lithium secondary battery.

For example, the lithium secondary battery may be manufactured, for example, in a cylindrical shape, a square shape, a pouch type or a coin shape.

In one embodiment, the electrolyte may include a lithium salt and an organic solvent.

In one embodiment, the lithium salt may include $Li^+X^-$. For example, $X^-$ may be at least one of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ or $(CF_3CF_2SO_2)_2N^-$.

In one embodiment, examples of the organic solvent may include: a carbonate solvent such as ethylene carbonate (EC), propylene carbonate (PC), dimethyl carbonate (DMC), diethyl carbonate (DEC), ethyl methyl carbonate (EMC), etc.; an ester solvent such as methyl propionate, ethyl propionate, ethyl acetate, propyl acetate, butyl acetate, butyrolactone, caprolactone, valerolactone, etc.; an ether solvent such as dibutyl ether, tetraethylene glycol dimethyl ether (TEGDME), diethylene glycol dimethyl ether (DEGDME), tetrahydrofuran (THF), etc.; an alcohol solvent such as ethyl alcohol, isopropyl alcohol, etc.; a ketone solvent such as cyclohexanone, etc.; a nonprotonic solvent such as an amide solvent (e.g., dimethylformamide), a dioxolane solvent (e.g., 1,3-dioxolane), a sulfolane solvent, a nitrile solvent, etc.

Hereinafter, some embodiments of the disclosed technology will be discussed by way of example.

Preparative Example 1 (Preparation of Secondary Particle Having 0 Mol % of Co)

$NiSO_4$ and $MnSO_4$ were mixed in a molar ratio of 75:25 by inputting them into distilled water from which dissolved oxygen was removed to prepare a mixed solution.

The mixed solution, NaOH and $NH_4OH$ were input into a reactor, and a co-precipitation reaction was performed for 55 hours to prepare metal hydroxide particles ($Ni_{0.75}Mn_{0.25}(OH)_2$).

The metal hydroxide particles and lithium hydroxide were put into a dry high-speed mixer so that a molar ratio thereof was 1:1.03, thus to prepare a mixture.

The mixture was put into a calcination furnace, and the temperature of the calcination furnace was increased to 700° C. at a rate of 2° C./min, then maintained at 700° C. for 15 hours. Oxygen gas was passed through the calcination furnace at a flow rate of 10 mL/min during calcination.

After completion of the calcination, the calcined product was naturally cooled to room temperature, then pulverized and classified to obtain lithium metal oxide particles ($LiNi_{0.75}Mn_{0.25}O_2$).

By observing a cross section of the lithium metal oxide particle with a scanning electron microscope (SEM), it was confirmed that the lithium metal oxide particle had a secondary particle shape in which primary particles were aggregated.

An average particle diameter ($D_{50}$) of the lithium metal oxide particles was measured using a laser diffraction method. The lithium metal oxide particles had an average particle diameter ($D_{50}$) of 13 μm.

Preparative Example 2 (Preparation of Single Particle Having 0 Mol % of Co)

$NiSO_4$ and $MnSO_4$ were mixed in a molar ratio of 75:25 by inputting them into distilled water from which dissolved oxygen was removed to prepare a mixed solution.

The mixed solution, NaOH and $NH_4OH$ were input into a reactor, and a co-precipitation reaction was performed for 60 hours to prepare metal hydroxide particles ($Ni_{0.75}Mn_{0.25}(OH)_2$).

The metal hydroxide particles and lithium hydroxide were put into a dry high-speed mixer so that a molar ratio thereof was 1:1.03, thus to prepare a mixture.

The mixture was put into a calcination furnace, and the temperature of the calcination furnace was increased to 950° C. at a rate of 2° C./min, then maintained at 950° C. for 10 hours. Oxygen gas was passed through the calcination furnace at a flow rate of 10 mL/min during calcination.

After completion of the calcination, the calcined product was naturally cooled to room temperature, then pulverized and classified to obtain lithium metal oxide particles ($LiNi_{0.75}Mn_{0.25}O_2$).

By observing a cross section of the lithium metal oxide particle with a scanning electron microscope (SEM), it was confirmed that the lithium metal oxide particle had a single particle shape.

An average particle diameter ($D_{50}$) of the lithium metal oxide particles was measured using a laser diffraction method. The lithium metal oxide particles had an average particle diameter ($D_{50}$) of 3.5 μm.

Preparative Example 3 (Preparation of Secondary Particle Having 2 Mol % of Co)

$NiSO_4$, $CoSO_4$, and $MnSO_4$ were mixed in a molar ratio of 75:2:23 by inputting them into distilled water from which dissolved oxygen was removed to prepare a mixed solution.

Lithium metal oxide particles ($LiNi_{0.75}Co_{0.02}Mn_{0.23}O_2$) were prepared in the same manner as described in Preparation Example 1, except that the mixed solution was used.

By observing a cross section of the lithium metal oxide particle with a scanning electron microscope (SEM), it was confirmed that the lithium metal oxide particle had a secondary particle shape in which primary particles were aggregated.

An average particle diameter ($D_{50}$) of the lithium metal oxide particles was measured using a laser diffraction method. The lithium metal oxide particles had an average particle diameter ($D_{50}$) of 13 μm.

Preparative Example 4 (Preparation of Single Particle Having 2 Mol % of Co)

$NiSO_4$, $CoSO_4$, and $MnSO_4$ were mixed in a molar ratio of 75:2:23 by inputting them into distilled water from which dissolved oxygen was removed to prepare a mixed solution.

Lithium metal oxide particles ($LiNi_{0.75}Co_{0.02}Mn_{0.23}O_2$) were prepared in the same manner as described in Preparation Example 2, except that the mixed solution was used.

By observing a cross section of the lithium metal oxide particle with a scanning electron microscope (SEM), it was confirmed that the lithium metal oxide particle had a single particle shape.

An average particle diameter (D50) of the lithium metal oxide particles was measured using a laser diffraction method. The lithium metal oxide particles had an average particle diameter (D50) of 3.4 μm.

EXAMPLES AND COMPARATIVE EXAMPLES

The cathode active material described in Table 1 below, PVDF, and the conductive material described in Table 1 below were dispersed in NMP in a weight ratio of 94:3:3 to prepare a cathode slurry. In Table 1 below, MWCNT (length: 30 μm) was used for A-1, and carbon black (sphericity >0.8, $D_{50}$: 35 nm) was used for A-2.

In Comparative Example 6, the cathode active material, PVDF, and the conductive material were mixed in a weight ratio of 93:2:5 to prepare a cathode slurry.

The cathode slurry was applied to an aluminum foil (thickness: 15 μm), followed by drying and rolling the same to prepare a cathode. A rolling density (density of the cathode active material layer) was controlled according to Table 1 below.

Among the densities of the cathode active material layer in Table 1 below, "○" means the case in which the density of the cathode active material layer is about 3.4 to 3.7 g/cc, and "x" means the case in which the density of the cathode active material layer is greater than 3.7 g/cc and 3.9 g/cc or less.

Lithium metal was used as a counter electrode (anode).

The cathode and the anode were notched in a circular shape, respectively, and a circular polyethylene separation membrane (thickness: 13 μm) was interposed between the cathode and the anode to prepare an electrode assembly.

A coin-type lithium secondary battery was manufactured by placing the electrode assembly in a coin-shaped casing, then injecting an electrolyte.

The electrolyte used herein was prepared by dissolving 1M $LiPF_6$ solution in a mixed solvent of EC/EMC (30/70, v/v).

Evaluation Example 1: Evaluation of Percolation Path of Cathode Active Material Layer (1) Specimens were prepared by cutting the cathodes of the examples and comparative examples into a size of 100 mm×100 mm, respectively.
(2) A 3D model illustrating a distribution of cathode active material particles in the specimen was prepared (this model was targeted at only the cathode active material particles).
(3) In the 3D model, paths passing between the cathode active material particles and passing through both sides in the thickness direction of the 3D model were analyzed.
(4-1) Diameters of the largest spheres (sphericity: 1) that could pass through each of the paths were measured. After arranging the measured diameters in descending order, an arithmetic average value ($D_A$) of the top 100 diameters was calculated.
(4-2) After arranging the paths in descending order of the measured diameters, an arithmetic average value ($L_A$) of lengths of the top 100 paths was calculated.

Analysis of the specimen was conducted with the following equipment and conditions.
i) Measurement equipment: Zeiss, 620 versa
ii) Measurement condition: Source condition of 50 kV and 4.5 W, Voxel size: 300 nm
iii) Analysis equipment and program: Geodict S/W and Material Characterization of Matdict
iv) Analysis condition: Computation direction of percolation path is set to the thickness direction (Z-direction)

Evaluation Example 2: Evaluation of High-Temperature Storage Characteristics (Measurement of Venting Time)

The lithium secondary batteries of the examples and comparative examples were CC/CV charged (0.3 C, 4.2 V, 0.05 C CUT OFF) to 100% state of charge (SOC).

The charged lithium secondary batteries were left in a thermostatic device (60° C. and atmospheric conditions), respectively.

The point at which venting occurs in a pouch case was confirmed.

When the peripheral portion (i.e., the sealing portion) of the pouch case was inflated or a separate gas discharge hole was formed, it was evaluated that venting occurred.

TABLE 1

| No. | Composition of cathode active material | Composition of conductive material | Density of cathode active material | $D_A$ (μm) | $L_A$ (μm) |
|---|---|---|---|---|---|
| Example 1 | Preparative Example 1 & Preparative Example 2 5:5 (w/w) | A-1 | ○ | 2.48 | 50.30 |
| Example 2 | Preparative Example 1 & Preparative Example 2 8:2 (w/w) | A-1 | ○ | 3.92 | 47.78 |
| Example 3 | Preparative Example 1 & Preparative Example 2 7:3 (w/w) | A-1 | ○ | 3.44 | 48.62 |
| Example 4 | Preparative Example 3 & Preparative Example 4 5:5 (w/w) | A-1 | ○ | 2.52 | 50.5 |
| Example 5 | Preparative Example 1 & Preparative Example 2 5:5 (w/w) | A-1 & A-2 1:2 (w/w) | ○ | 3.07 | 50.41 |
| Comparative Example 1 | Preparative Example 1 alone | A-1 | ○ | 4.88 | 46.1 |
| Comparative Example 2 | Preparative Example 1 & Preparative Example 2 5:5 (w/w) | A-1 | x | 4.2 | 46.3 |

TABLE 1-continued

| No. | Composition of cathode active material | Composition of conductive material | Density of cathode active material | $D_A$ (μm) | $L_A$ (μm) |
|---|---|---|---|---|---|
| Comparative Example 3 | Preparative Example 1 & Preparative Example 2 8:2 (w/w) | A-2 | ○ | 4.18 | 46.5 |
| Comparative Example 4 | Preparative Example 1 & Preparative Example 2 5:5 (w/w) | A-2 | x | 4.53 | 46.1 |
| Comparative Example 5 | Preparative Example 1 & Preparative Example 2 8:2 (w/w) | A-1 & A-2 1:9 (w/w) | ○ | 4.09 | 46.5 |
| Comparative Example 6 | Preparative Example 3 & Preparative Example 4 5:5 (w/w) | A-1 | ○ | 4.47 | 45.9 |

TABLE 2

| No. | Venting point (week) |
|---|---|
| Example 1 | 25 |
| Example 2 | 19 |
| Example 3 | 22 |
| Example 4 | 26 |
| Example 5 | 22 |
| Comparative Example 1 | 16 |
| Comparative Example 2 | 16 |
| Comparative Example 3 | 16 |
| Comparative Example 4 | 15 |
| Comparative Example 5 | 17 |
| Comparative Example 6 | 15 |

Referring to Tables 1 and 2 above, the secondary batteries of the examples in which $D_A$ of the cathode active material layer satisfies Equation 1 described above and $L_A$ satisfies Equation 2 described above had improved high-temperature storage characteristics compared to the secondary batteries of the comparative examples.

In the case of the comparative examples, the secondary batteries had the same composition of the cathode active material as the examples, but the high-temperature stability was reduced as $D_A$ and $L_A$ of the cathode active material layer did not satisfy the ranges of Equations 1 and 2 described above. For example, it can be confirmed that, even if the composition of the cathode active material, the composition of the slurry, and the density or thickness of the cathode active material layer are the same as each other, when $D_A$ and $L_A$ of the cathode active material layer do not satisfy Equation 1 described above, the high-temperature storage characteristics are reduced.

The disclosed technology can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments are described. Variations, improvements and enhancements of the disclosed embodiments and other embodiments may be made based on the disclosure of this patent document.

What is claimed is:

1. A cathode comprising:
   a cathode current collector; and
   a cathode active material layer disposed on the cathode current collector, the cathode active material layer having a density of 3.4 g/cc to 3.7 g/cc and including cathode active material particles and a conductive material including a linear-type conductive material and a dot-type conductive material,
   wherein the cathode active material particles include lithium metal oxide particles that include nickel, the lithium metal oxide particles include first lithium metal oxide particles having a secondary particle shape in which a plurality of primary particles is aggregated; and second lithium metal oxide particles having a single particle shape and having an average particle diameter (D50) smaller than that of the first lithium metal oxide particles, and the first lithium metal oxide particles have a mole fraction of cobalt less than 0.02 and the second lithium metal oxide particles have a mole fraction of cobalt less than 0.02 with respect to all elements except for lithium and oxygen,
   wherein a ratio of a content of the dot-type conductive material to a content of the linear-type conductive material is in a range 1/9 to 2,
   wherein the linear-type conductive material comprises multi-walled CNTs having a length of 30 μm to 65 μm,
   wherein the cathode active material layer includes paths formed between the cathode active material particles having the secondary particle shape or the single particle shape,
   wherein the cathode active material particles in the cathode active material layer have an average diameter value ($D_A$) expressed as 0.5 μm≤$D_A$≤4 μm and an average length value ($L_A$) expressed as $L_A$>47 μm, wherein $D_A$ is an arithmetic average value of top 100 diameters obtained by: in a three-dimensional (3D) model illustrating a distribution of the cathode active material particles in the cathode active material layer, analyzing the paths formed between the cathode active material particles distributed in the 3D model and passing through the 3D model from a first side of the 3D model to a second side of the 3D model, wherein the first side and the second side are opposite in a thickness direction of the 3D model; measuring diameters of largest spheres capable of passing through each of the paths; arranging the measured diameters in descending order; and determining the top 100 diameters of the measured diameters, wherein the 3D model is generated by: obtaining measurement data of the cathode active material layer using a 3D X-ray microscope; and performing an image processing on the measurement data to show cathode active material particles that are distributed in the 3D model such that the paths are arranged in the thickness direction of the 3D model, wherein a source condition of the 3D X-ray microscope is set to 50 kV and 4.5 W, and a voxel side of the 3D X-ray microscope is set to 300 nm, wherein $L_A$ is an arithmetic average value of top 100 lengths of the paths obtained by: in the 3D model, analyzing paths formed between the cathode active material particles distributed in the 3D model and passing through the 3D model from the first side of the 3D model to the second side of the 3D model, wherein the first side and the second side are opposite in the thickness direction of the 3D model; measuring the diameters of the largest spheres capable of passing through each of the paths; arranging the paths in descending order of the diameters; and determining the top 100 lengths of the paths.

2. The cathode according to claim 1, wherein $L_A$ is in a range of 47 μm≤$L_A$≤65 μm.

3. The cathode according to claim 1, wherein the lithium metal oxide particles are formed without cobalt.

4. The cathode according to claim 1, wherein a molar fraction of nickel in the lithium metal oxide particles is in a range from 0.7 to 0.85 with respect to all elements except for lithium and oxygen.

5. The cathode according to claim 1, wherein a ratio of a weight of the second lithium metal oxide particles to a weight of the first lithium metal oxide particles in the cathode active material layer is in a range from 1/4 to 4.

6. The cathode according to claim 1, wherein the first lithium metal oxide particles have an average particle diameter ($D_{50}$) of 9 μm to 20 μm, and
the second lithium metal oxide particles have an average particle diameter ($D_{50}$) of 1 μm or more and less than 9 μm.

7. The cathode according to claim 1, wherein the first lithium metal oxide particles have an average particle diameter ($D_{50}$) of 9 μm to 20 μm, and
the second lithium metal oxide particles have an average particle diameter ($D_{50}$) of 2 μm to 7 μm.

8. The cathode according to claim 1, wherein the cathode active material layer further comprises a binder,
wherein a content of the cathode active material particles is in a range from 85% to 98% by weight based on a total weight of the cathode active material layer.

9. The cathode according to claim 8, wherein the linear-type conductive material has a length of 15 μm to 65 μm, and
the dot-type conductive material has a particle diameter ($D_{50}$) of 10 nm to 60 nm.

10. A lithium secondary battery comprising:
a cathode; and
an anode facing the cathode,
wherein the cathode includes:
a cathode current collector; and
a cathode active material layer disposed on the cathode current collector, the cathode active material layer having a density of 3.4 g/cc to 3.7 g/cc and including cathode active material particles and a conductive material including a linear-type conductive material and a dot-type conductive material, wherein the cathode active material particles include lithium metal oxide particles that include nickel, the lithium metal oxide particles include first lithium metal oxide particles having a secondary particle shape in which a plurality of primary particles is aggregated; and second lithium metal oxide particles having a single particle shape and having an average particle diameter ($D_{50}$) smaller than that of the first lithium metal oxide particles, and the first lithium metal oxide particles have a mole fraction of cobalt less than 0.02 and the second lithium metal oxide particles have a mole fraction of cobalt less than 0.02 with respect to all elements except for lithium and oxygen, wherein a ratio of a content of the dot-type conductive material to a content of the linear-type conductive material is in a range 1/9 to 2, wherein the linear-type conductive material comprises multi-walled CNTs having a length of 30 μm to 65 μm, wherein the cathode active material layer includes paths formed between the cathode active material particles having the secondary particle shape or the single particle shape, wherein the cathode active material particles in the cathode active material layer have an average diameter value ($D_A$) expressed as 0.5 μm≤$D_A$≤4 μm and an average length value ($L_A$) expressed as $L_A$>47 μm, wherein $D_A$ is an arithmetic average value of top 100 diameters obtained by: in a three-dimensional (3D) model illustrating a distribution of the cathode active material particles in the cathode active material layer, analyzing the paths formed between the cathode active material particles distributed in the 3D model and passing through the 3D model from a first side of the 3D model to a second side of the 3D model, wherein the first side and the second side are opposite in a thickness direction of the 3D model; measuring diameters of largest spheres capable of passing through each of the paths; arranging the measured diameters in descending order; and determining the top 100 diameters of the measured diameters, wherein the 3D model is generated by: obtaining measurement data of the cathode active material layer using a 3D X-ray microscope; and performing an image processing on the measurement data to show cathode active material particles that are distributed in the 3D model such that the paths are arranged in the thickness direction of the 3D model, wherein a source condition of the 3D X-ray microscope is set to 50 kV and 4.5 W, and a voxel side of the 3D X-ray microscope is set to 300 nm, wherein $L_A$ is an arithmetic average value of top 100 lengths of the paths obtained by: in the 3D model, analyzing paths formed between the cathode active material particles distributed in the 3D model and passing through the 3D model from the first side of the 3D model to the second side of the 3D model, wherein the first side and the second side are opposite in the thickness direction of the 3D model; measuring the diameters of the largest spheres capable of passing through each of the paths; arranging the paths in descending order of the diameters; and determining the top 100 lengths of the paths.

11. The lithium secondary battery according to claim 10, wherein a molar fraction of nickel in the lithium metal oxide particles is in a range from 0.7 to 0.85 with respect to all elements except for lithium and oxygen.

* * * * *